United States Patent [19]
Butzow et al.

[11] 3,974,009
[45] Aug. 10, 1976

[54] METHOD FOR MAKING BALL AND SOCKET TYPE BEARINGS IN MULTIPLE

[75] Inventors: Neil W. Butzow, Greendale; Bernard Harris, Milwaukee, both of Wis.

[73] Assignee: Rex Chainbelt Inc., Milwaukee, Wis.

[22] Filed: May 21, 1969

[21] Appl. No.: 826,565

[52] U.S. Cl. .................................. 156/84; 156/161; 156/173; 308/238
[51] Int. Cl.² ......................................... B29C 27/22
[58] Field of Search ............... 156/84, 86, 154, 267, 156/193, 191, 173, 172; 308/238, 72; 29/149.5 NM

[56] References Cited
UNITED STATES PATENTS

| | | | |
|---|---|---|---|
| 2,025,830 | 12/1935 | Rosmait | 156/193 X |
| 2,325,073 | 7/1943 | Reach | 156/267 X |
| 2,862,283 | 12/1958 | Rasero | 161/189 X |
| 3,294,609 | 12/1966 | Foll | 156/84 X |
| 3,328,100 | 6/1967 | Spakes et al. | 308/238 |
| 3,340,115 | 8/1967 | Rubenstein | 138/176 X |
| 3,507,023 | 4/1970 | Matt et al. | 308/238 X |

FOREIGN PATENTS OR APPLICATIONS 698,611   10/1953   Canada

*Primary Examiner*—Harold Tudor

[57] ABSTRACT

Identical or similar balls are assembled on an arbor and a low-friction material-lined glass filament-reinforced hardened epoxy tube is formed thereover. The outer diameter of the tube is finished and the tube is cut into sections to comprise the sockets or outer races for the balls.

14 Claims, 7 Drawing Figures

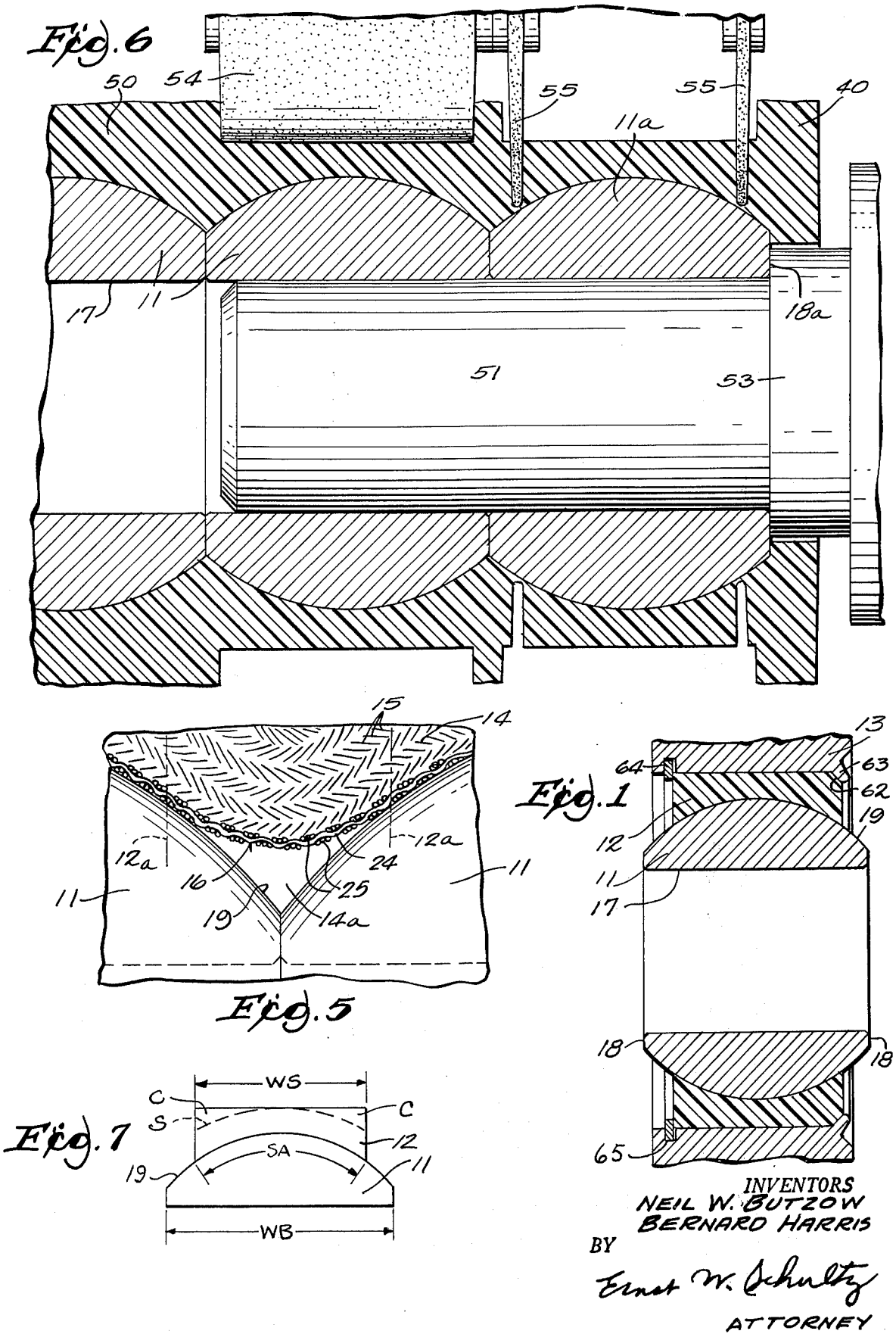

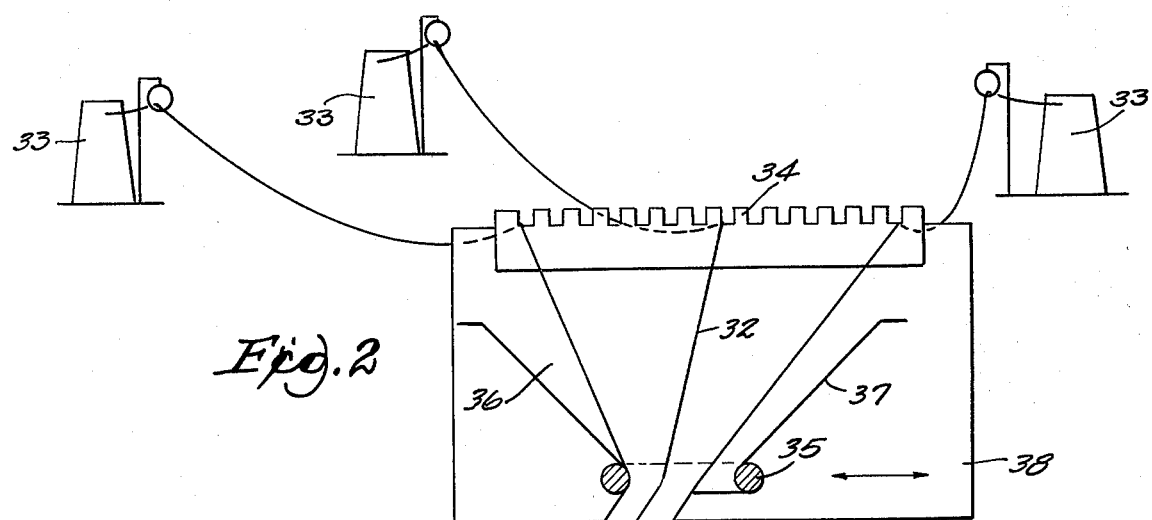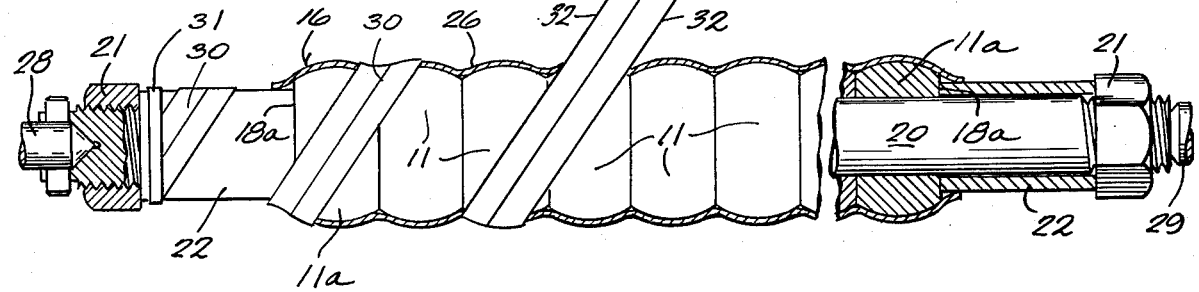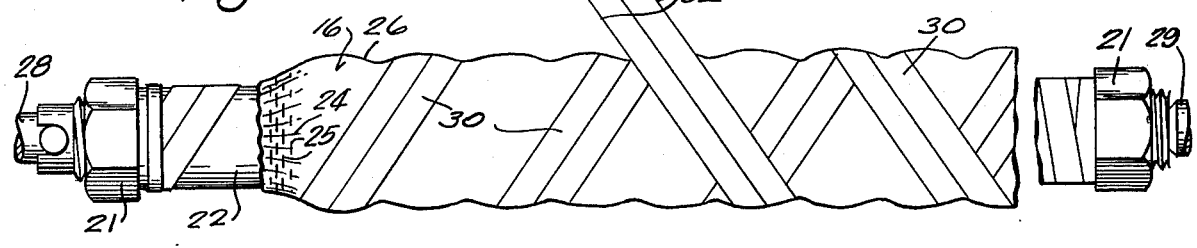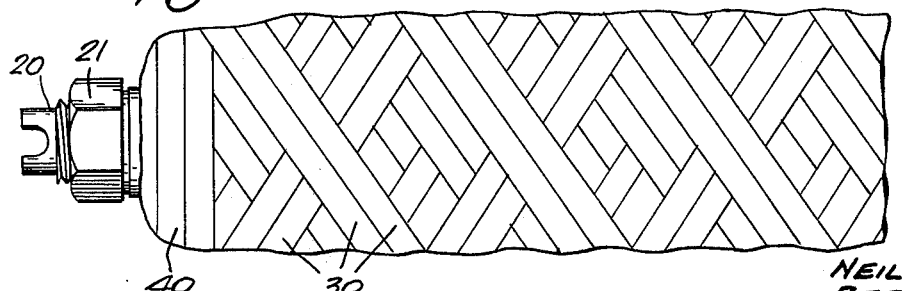

METHOD FOR MAKING BALL AND SOCKET TYPE BEARINGS IN MULTIPLE

CROSS REFERENCE TO RELATED APPLICATIONS

A method of making a series of Teflon fabric-lined cylindrical bearings is disclosed and claimed in application Ser. No. 730,399 filed May 20, 1968, now U.S. Pat. No. 3,616,000, present inventors. This invention utilizes the method disclosed by said application to form a series of bearings having completely finished bearing surfaces and requiring only external dimensioning.

BACKGROUND OF THE INVENTION

1. Field of Invention

The subject matter of the claimed invention is a ball and socket bearing including a metal ball and an outer race or socket formed thereover of filament-reinforced material having a low friction bearing surface in direct contact with the ball. The ball is of the type having a central bore therethrough and circular, flat end faces normal to the axis of the bore. The width of the ball refers to the distance between said ends.

The outer race or socket as formed on the ball has a spherical inner diameter corresponding to the outer diameter of the ball. The outer race or socket has parallel ends and the distance therebetween is considered the width of the socket. Normally the width of a socket is less than the width of the ball to allow their relative angular movement while the socket remains in full contact with the ball. That is, the ball normally has "projecting ends." For convenience also in describing the present invention, the area of athe ball between said ends will be referred to as the "socket area" of the ball.

In use, the socket of the bearing assembly is supported and secured withing a rigid housing. For that purpose, the socket is finished so that it has a cylindrical outer dimension to fit therein.

It is commercially important that the ball have a certain torque before and after the socket is secured in the supporting housing. This torque is the force in inch-/pounds which is required to turn the ball in the socket and on the axis of its bore. Zero torque denotes a ball of maximum looseness.

The socket should therefore fit in the housing so that only axial securement is required and may be provided by bonding or with any suitable locking rings or swaged collars. This also means that the socket must be self-supporting axially and presents a particularly difficult strength requirement as will be described.

2. Description of the Prior Art.

In the manufacture of metal sleeve bearings, cutting a long tube to multiple lengths to comprise the sleeves is itself a common expedient. The internal bearing diameter of the individual sleeves can then be finished separately. Even after finishing, the diameter of the bearing may be made larger or smaller within limits, by well known means.

In the manufacture of metal ball and socket bearings, the sockets may be expanded after their completion to provide the desired fit. Typically, such assemblies when completed are tested for their torque and grouped accordingly. Those which are not too tight can be loosened by compressively stressing the outer portions of the metal forming the sockets.

This cut and try procedure for bearings with metal sockets cannot be used for bearings having outer sockets of other materials. Such sockets including those of the present invention must have the desired fit as and when completed.

SUMMARY OF THE INVENTION

The balls of ball and socket bearings are assembled on an arbor and a low friction fabric sleeve is drawn and shrunk thereover. As the arbor is turned, an epoxy-filled glass-filament tape is helically crosswound over the sleeve at such angles that the filaments and the fabric bridge only the adjoining ends of adjacent balls. The epoxy is hardened to form a rigid tube forming a series of sockets for the balls contained therein.

The tube or shorter sections of the tube are exteriorly dimensioned and then cut to the lengths of the desired sockets. Alternatively, the tube is cut to the lengths of the individual sockets which are then exteriorly dimensioned to fit the intended supporting housings.

The bearing of the present invention may be produced in quantity at low cost. The fabric of the bearing is seamless. The filaments which press the sleeve against the mandrel operate with complete uniformity over the entire area of the fabric. Bearings of the same size can thus be consistently manufactured at relatively high rates with consistent results having reference to the torque requirements for such bearings as described.

BRIEF DESCRIPTION OF THE DRAWINGS

FIG. 1 shows a completed ball and socket assembly in section and within a rigid metal housing which is broken away and sectioned. FIG. 2 shows partly in section the arbor with a series of balls mounted thereon and between end nuts on the arbor for securing the balls in tight end to end relation; the fabric sleeve which has been drawn from a reel and shrunk to fit tightly over the balls; the ends of the arbor supported in a winding machine; the tape as it is wound around the sleeve; and diagrammatically, the roves as they are drawn from the creels through the liquid epoxy resin carried in the reciprocating carriage of the winding machine.

FIG. 3 shows the assembly with the second helix or spiral partially completed.

FIG. 4 shows the pattern of the completed winding of a fraction of one end of the assembly as it would be ready for curing of the resin in an oven, not shown.

FIG. 5 shows in an enlarged elevation parts of adjoining balls and in section the adjoining part of the hardened tube as formed thereover particularly to show the bridging portions of the sleeve.

FIG. 6 is an enlarged cross-section of one end of the tube after the cores have been removed and shows the grinding wheels which finish the sockets to the desired outside diameter and separate the two adjoining sockets.

FIG. 7 is a diagram to illustrate certain parts of the bearing assembly shown in FIG. 1 and the nomenclature used in the claims.

DESCRIPTION OF THE PREFERRED EMBODIMENT

The completed bearing assembly as shown in FIG. 1 includes the ball 11 and the outer race or socket 12 which fits and encircles the ball. Socket 12 is press fitted within the housing 13 and is secured axially. Housing 13 may be any rigid structure having a cylindrical bore to receive the assembly.

The ends of socket 12 are parallel and the distance therebetween is the width WS as shown in FIG. 7. The outer dimension of socket 12 is cylindrical to fit within housing 13 and the inner dimension is spherical such that the socket has a minimum cross-section in its medial plane. The main body of socket 12 is that portion lying within the imaginary sphere denoted by the broken line S of FIG. 7. The remaining "corners" C of the socket extend from the medial plane to the ends of the socket and lie outside of the sphere referred to. The width WB of ball 11 is the distance between end faces 18 and the "socket area" of the ball is the spherical area between the planes defined by the ends of the socket as indicated by the arrow SA.

As shown in FIG. 5, socket 12 is of a hardened material 14 which is reinforced by glass filaments 15 and further includes a low-friction material or fabric 16 which is in direct engagement with the ball.

Each ball 11 is machined from a suitable steel alloy having such resistance to wear and corrosion as may be required and is provided with a central cylindrical bore 17 for receiving the bolt or pin, not shown, of whatever part is to be connected thereto. The ball is provided with flat circular end faces 18. The entire spherical surface 19 between end faces 18 forms the bearing surface of the ball and is ground to the required final dimension and may also be anodized or electroplated for the required finish.

In carrying out the present invention, a series of balls 11 are assembled in end-to-end relation on the cylindrical arbor 20 having a sliding to medium fit within bores 17 so that the balls are supported thereon with no looseness.

The length of arbor 20 is essentially limited by its diameter and rigidity and the capacity of the winding machine which is to be used. Typically, an arbor having a diameter of 5/8⅝ may be 4 feet in length and a group of 48 balls of 5/8⅝ length can be assembled thereon. Similarly, an arbor having a diameter of 1 ¼ 1/4 inches might be 10 feet in length and support 56 balls of 2 ½ 1/2 inches diameter.

Both ends of arbor 20 are provided with dead center bearings and are also threaded to receive the nuts 21. At least one end of arbor 20 is also provided with a drive slot, as shown. A tubular core 22 is assembled on arbor 20 between each nut 21 and the end faces 18a of the balls 11a at the ends of the series.

Nuts 21 secure all of the balls 11 assembled on arbor 20 in tight end-to-end relation and are tightened to hold the balls and cores on the arbor and prevent their rotation as well as axial movement. To a degree, the tension applied to the arbor contributes to the rigidity of the assembly.

It is necessary or at least desirable that the resin to be applied over the balls be prevented from flowing therebetween and from entering the limited clearance within their bores and around the arbor. For that purpose, a sealant may be provided between the adjoining end faces 18 of balls 11. This sealant may be a semi-liquid coating which is applied to the end faces 11 of the balls before their assembly on the arbor, or may be thin washers, not shown, which are assembled on the arbor intermediate the balls.

A preferred construction of fabric 16 is described in the co-pending application referred to. Generally, the lengthwise yarns 24 of the fabric should be predominantly of a low-friction material such as Teflon and the circumferential yarns 25 should be of a bondable material which is unshrunk and which shrinks when heated for example, to 300°F where the yarns 25 are of Dacron.

The fabric may be of any suitable weave. Because the fabric should readily conform to the spherical surface of each ball, the weave should not be too tight. Additionally, the resin to be applied as will be described must be able to permeate the fabric.

The fabric 16 is most conveniently woven in the form of the sleeve 26 which may be of any continuous length and stored as on reel, not shown, until required. After assembly on arbor 21 but before being inserted in sleeve 26, the balls 11 are coated with a suitable parting-agent such as one of the silicone solutions which are now available.

The sleeve 26 after being removed from the storage reel is cut to a length in the order of ten per cent greater than the assembled width of the balls to allow for any slight axial shrinkage and particularly so that the sleeve can be gathered axially or lengthwise. After such gathering, the sleeve should extend the full distance between cores 22 and may overlie the cores. The amount of the gathering is to allow the fabric to reach sufficiently the smaller diameter of the balls at their adjoining ends when the fabric is compressed over the spherical surface of the balls.

Balls 11 on arbor 20 and with sleeve 26 are then placed in an oven to heat the sleeve momentarily to shrink the circumferential yarns of the sleeve. Alternative methods of shrinking the sleeve are mentioned in the co-pending application referred to. In particular, the shrinking by whatever means the fabric is heated should cause the fabric to conform substantially to the socket area of the ball.

After cooling, arbor 20 is supported between driving head 28 and spindle 29 of the winding machine. The initial end of the tape 30 to be wound as will be described is first secured as with an elastic band 31 over either core 22. In FIG. 2 band 31 is fixed on the core 22 at the left.

Tape 30 consists of a number of parallel roves 32 of glass filaments (15) and the resin carried thereby. The roves are drawn as from creels 33 over the comb 34 in the usual manner.

Roves 32 may be dipped in a pan of resin before passing through the ring 35 disposed above the arbor. Alternatively, as shown, roves 32 pass downwardly through the resin 36 carried in the cone 37 and through the ring 35 which comprises the lower end of the cone. Means such as a loose plug, not shown, is provided to close the lower end of the cone sufficiently to retain the resin supply.

Comb 34 and cone 37 including ring 35 are supported by the reciprocating carriage 38 which may also be provided with means, not shown, to keep the cone supplied with resin.

The selection of the resin 36 which is to form material 14 is, of course, of importance. Any of the synthetic resins available would be suitable for bearings having certain applications. In general, an epoxy resin which is relatively stable in storage is preferred. By adding a selected catalyst in certain amounts to the resin as it is used, its viscosity as well as a predetermined curing cycle in terms of time and temperature may be selected and periodically adjusted as previous results indicated.

The resin in liquid form should have a sufficiently low viscosity as applied to the fabric sleeve so that the interstics of the fabric are entirely filled by capillary action. Conversely, it is essential that not air is trapped by the resin.

As disclosed in the co-pending application referred to, attention must be given to the tension applied to the tape in winding. A tension in the order of two to four pounds per rove has been found adequate to keep the tape tight and also to be sure of driving or forcing the resin through the sleeve to the assembled balls 11. With such a tension a pressure of two to four pounds per square inch would be applied to sleeve 26. However, because of the contour of balls 11, in some cases a greater tension may be required and would very likely also be required to provide the desired ratio of exposed Teflon and resin at the bearing surfaces.

With rotation of arbor 20 and reciprocation of carriage 38, the sleeve 26 is wrapped with the tape 30 in the prior art manner described in the co-pending application referred to. It should be noted that the direction of the winding of tape 30 changes only as the tape winds around cores 22 at the ends of arbor 20 and that the tape forms end sections 40 which will later be discarded.

The winding of tape 30 should proceed at a helix angle so that the tape is effective to shape and progressively press fabric sleeve 26 over the socket areas of the balls. As shown in FIGS. 2–4 of the drawings, the tape 30 is wound at an angle of 35° respecting a plane normal to the axis of the arbor. To the extent that the function of the filaments 15 of the completed bearing is to provide axial strength so that the socket will be self-supporting in the axial direction, the winding angle might be increased so that the filaments be more nearly in the axial direction. However, the winding angle cannot be increased too much because of the bridging of the tape which occurs between balls.

The consequences of the bridging referred to is that the filaments 15 comprising the roves 32 of the tape do not press the fabric fully against the adjoining ends of the balls and it is of paramount importance that the amount of bridging be sufficiently limited so that the fabric 16 is firmly pressed against the entire "socket area" of each ball.

The minimum number of wraps of tape 30 required is generally determined by the width of the tape or the number of roves 32. This width or number is generally limited only by the size of the winding machine. Incidental thereto, the wider tape requires longer cores 22 and involves somewhat more waste at the ends of the winding.

The winding essentially comprises a number of spaced spirals in each direction so that a given number of spirals effects a complete covering.

Two considerations are especially important to the winding pattern or sequence employed. The winding initially must progressively press uniformly the fabric 16 of sleeve 26 against balls 11 and a minimum number of overlying tape layers or plies (of filaments 15) should be required to provide one complete covering. Thus, as shown, two layers or plies are required to provide one complete covering of the fabric. The total number of plies required depends, of course, on the finished size of the socket which is desired.

When the winding is completed the tape 30 is cut and the end may be similarly secured with a band, not shown, similar to band 31. The arbor is removed from the winding machine and the assembly is immediately ready for curing of the resin which has been applied.

The arbor 20 is handled at its ends only and is placed in an oven, not shown, for curing of resin 36. Alternatively, resin 36 may be directly heated by infra red or high frequency radio radiation or the balls 1 may be heated directly by magnetic induction. As may be required, the arbor is supported horizontally by and between a rotating head and dead center so that the assembly rotates in the order of 30 r.p.m. during the curing cycle to prevent dripping.

Upon curing of resin 36, the hardened material 14 and filaments 15 form the rigid tube 50 and when cooled the arbor 20 may be withdrawn from the assembly of balls 11 and cores 22 may be removed from the tube for reuse. The tube 50 may be stored or immediately finished as will be described to provide individual bearing assemblies.

In the completed tube, the bonded yarns 25 of fabric 16 extend circumferentially of the balls and with the Teflon yarns 24 are embedded in the hardened material 14. The Teflon yarns 24 extend longitudinally and are in direct contact with the spherical surfaces 19 of balls 11. As shown in FIG. 5, the fabric may bridge the ends of adjoining balls at the corners lying between the projecting ends of balls 11. This space is filled with the hardened material 14a. The broken lines 12a denote the ends of the sockets 12 to be formed from the tube and also the limits of the "socket areas" of the respective balls 11. As stated, it is important that the fabric 16 bridging the material 14a in each of the corners referred to lies well between the broken lines 12a.

In separating and finishing the individual sockets of the tube, their outer diameter may be finished before or after they are separated axially by cutting the tube. In general, the cores 22 should first be removed if they are to be reused. Alternatively, the ends 40 of tube 50 may first be cut off at locations near the end faces 18a of the balls 11a at the ends of the tube. These locations may be measured from the outer ends of cores 22 and the removal of the small remaining portions of the cores will expose end faces 18a of balls 11a for subsequent indexing.

It has been found that the outer diameter of sockets of the smaller sizes are preferably ground using a centerless grinder. For that purpose, the tube may be first cut to intermediate lengths depending upon the capacity of the available grinder. In doing so, the cutter may be set to cut into the hardened material 14a and the remainder may be readily broken in separating the intermediate lengths.

Alternatively, tube 50 may be progressively cut at selected locations each time as measured from the exposed end face of the end ball and to form completed and separate sockets. As shown in FIG. 6, the end of the tube 50 is mounted on and turned by the spindle 51 fitting the bores 17 of balls 11.

Spindle 51 directly supports two balls 11 at one end of the tube and suitable means not shown such as the tail stock of a lathe may support the other end of the tube. Tube 50 is always positioned axially on spindle 51 so that the end face 18a of the ball 11a which is at the end of the tube is in engagement with collar 53 of the spindle. As tube 50 rotates, the grinding wheel 54 is advanced toward the spindle to grind the tube to form the cylindrical outer diameter of the socket which is the second from the end of the tube. At the same time, the dual cutter wheels 55 are advanced to cut and finish the end faces of the socket at the end of the tube. The depth of cut of cutter wheels 55 respecting the axis of the bore 17 of the ball 11 is precisely controlled so that the cut approaches the surfaces of the balls to about 0.001 inch thereof.

After withdrawing wheels 54 and 55 the socket 12 and the adjoining waste sections remain connected only by a few filaments of fabric 16. These filaments are readily cut with another tool, not shown, of a material which is softer than the face of ball 11 so that this cutting tool may be allowed to contact the ball without damage. This tool may be a hand-held knife or an automatic tool. Upon completion of this operation, the tube 50 and the newly completed ball and socket assembly may then be separately removed from spindle 51 and the same operations may be repeated.

The present invention thus provides for the manufacture of ball and socket assemblies in large groups.

Two typical methods of securing the finished socket 12 in housing 13 are illustrated in FIG. 1. The outer corner of the finished socket 12 is chamfered as at 62 and the lip 63 of housing 12 is rolled over the chamfered corner to secure the socket against displacement in one direction. The snap-ring 64 in the groove 65 of housing 13 secures socket 12 against movement in the other direction.

It may be noted that the "corners" of socket 12 are otherwise unsupported by housing 13 and against axial loads applied to ball 12. As a consequence, the axial strength of socket 12 and the reinforcement provided by filaments 15 is most important. The filaments of the main body of the socket extend from end to end of the socket and prevent crushing of the socket under radial loads which tend to fracture the socket along its medial plane. The socket of the present invention is thus unique in that these reinforcing glass filaments extend helically around the ball under uniform tension across the narrowest part of the socket at its median so that the socket can be dimensioned generally smaller than any sockets of the prior art, having reference, of course, to sockets for balls of the same size. Also, the glass filaments of the "corners" of the socket which extend from each end of the socket and terminate at its outer surface, are in crossed plies at the selected winding angle and also provide the necessary reinforcement of the socket against axial loads.

Since the socket is of lightweight material, the weight reduction of the assembly by reason thereof may be important as when the ball and socket assembly is to be employed, for example, in a rod end for the control elements of aircraft.

What is claimed is:

1. The method of constructing ball and socket assemblies in multiple, each ball having a spherical bearing surface between circular ends and central bore therethrough, each socket comprising a hardened material with helically wound reinforcing filaments and a low-friction material adjoining the bearing surface of the ball; which method comprises the steps of assembling and securing said balls in endwise relation on a rigid arbor and between cores, providing said material in the form of a sleeve and tightly applying the same over the assembled balls with sufficient gathering at the joints between balls, simultaneously applying the liquid material to the outside of the sleeve and rotating the arbor and winding the filaments under tension over the sleeve to compress the latter, said filaments being helically wound in a continuous operation by reversing the direction of the helix while winding around the cores and at such angle that the sleeve gatherings are tightened over the balls with a minimum amount of bridging of the sleeve over the joints between balls, maintaining the entire assembly at such temperature which causes the liquid material to harden with rotation as required and to form a rigid tube which includes said filaments and sleeve, and as a final step cutting and finishing the sections of said tube around said balls to separate the same and provide each with the desired socket.

2. The invention of claim 1 wherein said final step includes cutting of the tube to within a very short distance of the ball and then manually tearing or cutting with a knife softer than the ball the remaining uncut threads of the sleeve to effect complete separation of the sockets.

3. The invention of claim 1 wherein said final step includes finishing the reinforced material to the desired outside diameter and progressively cutting the reinforced material and sleeve to provide individual ball and finished socket assemblies, the bridging portions of the sleeve and surrounding material being discarded and forming no part of the finished ball and socket assembly.

4. The invention of claim 3 wherein said final step first includes subdividing the tube into shorter lengths by cutting the reinforced material and sleeve at each joint between the balls.

5. The method of constructing a metal ball and low-friction socket assembly, the ball being spherical between flat circular ends and having a central bore therethrough, the socket comprising a base material hardened from a liquid, a low-friction fabric embedded in said material and having one side in bearing contact with the ball, and helical reinforcing glass filaments wound in layers around the fabric and embedded in said material; said method comprising the steps of placing the ball on an arbor between circular forms adjoining the flat circular ends of the ball and also carried by said arbor, providing said fabric in the form of a sleeve and shrinking the same over said ball, providing said filaments in a parallel array as a flat tape, transporting the liquid material by applying it to the tape, applying the liquid material to the outside of the fabric by rotating the arbor and helically winding the tape under tension over said forms and the fabric to compress the latter and further conform said one side of the fabric to the ball, thereafter maintaining the entire assembly at such temperature which causes the liquid material to harden while rotating the assembly, and cutting the hardened material to the desired outside diameter and axial dimension to comprise the socket, said axial dimension being less than the distance between the ends of the ball, the cut-away portions of the hardened base material and filaments overlying the ends of the ball and the forms being no part of the assembly.

6. The invention of claim 1 wherein said final step includes cutting of the tube to within a very short distance of the ball and then forcing each end section away from the tube and in that manner tearing the ramaining uncut threads of the sleeve to effect complete separation of the sockets.

7. The method of making a plain spherical bearing having rotatable inner and outer ring members with a spherical sliding interface, which comprises selecting an innerring member with an outer convex spherical surface characterized by a bearing portion thereof that is circumferentially continuous about a central axis, circumferentially enveloping said surface with a flexible low-friction fabric, said fabric being circumferentially continuously wetted with a hardenable material in its liquid state, helically enwrapping the wetted fabric with strands of a reinforcing material to which said hardenable material is bondable, wetting the reinforcing material with liquid hardenable material, whereby fibers of the fabric and of the reinforcing material are embedded in hardenable material, curing the hardenable material to ultimate hardness, and finishing the hardened mass to desired external contour.

8. The method of claim 7 in which the fabric is wetted with hardenable material after assembly to said spherical surface.

9. The method of claim 7 in which the helical wrapping is under tension of such magnitude as to enforce conformance of said fabric to the spherical surface of said inner-ring member.

10. The method of making a plurality of plain spherical bearings each having rotatable inner and outer members with a spherical sliding interface, which comprises assembling a plurality of such inner members in longitudinally aligned array, whereby the external contour of the assembly is characterized by plural spaced spherical surfaces, circumferentially enveloping said contour with a flexible low-friction fabric, enwrapping the fabric with helical strands of a reinforcing material to which hardenable-liquid bonding material is bondable, said wrapped strands and fabric being impregnated with said material, whereby fibers of the fabric and of the reinforcing material are enbedded in hardenable material, curing the hardenable material to ultimate hardness, and severing separate bearings by radial-plane cutting of the hardened mass at substantially bearing-unit intervals.

11. The method of making a plurality of plain spherical bearings each having rotatable inner and outer ring members with a spherical sliding interface, and the innerring member having a cylindrical mounting bore, which comprises selecting an elongated cylindrical mandrel of size to fit and concentrically support the inner-ring bore assembling a plurality of such inner-ring members to the mandrel in longitudinally aligned array, whereby the external contour of the mandrel is characterized by plural spaced spherical surfaces, circumferentially enveloping said contour with a flexible low-friction fabric, helically enwrapping the fabric with strands of a reinforcing material to which hardenable-liquid bonding material is bondable, said wrapped strands and fabric being impregnated with said material, whereby fibers of the fabric and of the reinforcing material are embedded in hardenable material curing the hardenable material to ultimate hardness, finishing the hardened mass to desired external contour, and severing separate plain-spherical bearings by radial-plane cutting of the hardened mass at substantially bearing-unit intervals.

12. The method of claim 11 in which the mandrel is removed prior to said cutting step.

13. The method of making a plurality of bearings each having relatively rotatable inner and outer members in engagement at a sliding interface which is a surface of revolution about an axis of rotation, which comprises adjacently assembling a plurality of such inner members with their axes in longitudinally aligned array, whereby the external contour of the assembly is characterized by a succession of the convex surfaces of said inner members, circumferentially enveloping said contour with a flexible low-friction fabric, helically enwrapping the fabric with strands of a reinforcing material to which hardenable-liquid bonding material is bondable, said wrapped strands and fabric being impregnated with said material, whereby fibers of the fabric and of the reinforcing material are embedded in hardenable material, curing the hardenable material to ultimate hardness, and severing separate bearings by radial-plane cutting of the hardened mass at substantially bearing-unit intervals.

14. The method of claim 13 in which a parting agent is applied to said contour prior to fabric application thereto.

* * * * *